(12) United States Patent
Li

(10) Patent No.: US 6,840,623 B2
(45) Date of Patent: Jan. 11, 2005

(54) LIGHT RECOVERY FOR PROJECTION DISPLAYS

(75) Inventor: Kenneth K. Li, Arcadia, CA (US)

(73) Assignee: Wavien, Inc., Santa Clarita, CA (US)

( * ) Notice: Subject to any disclaimer, the term of this patent is extended or adjusted under 35 U.S.C. 154(b) by 0 days.

(21) Appl. No.: 10/128,526

(22) Filed: Apr. 24, 2002

(65) Prior Publication Data

US 2003/0063261 A1 Apr. 3, 2003

Related U.S. Application Data

(60) Provisional application No. 60/286,006, filed on Apr. 25, 2001, and provisional application No. 60/296,146, filed on Jun. 7, 2001.

(51) Int. Cl.[7] .................. G03B 21/14; G03B 21/00; G03B 21/28
(52) U.S. Cl. ................. 353/20; 353/84; 353/31; 353/98
(58) Field of Search .................. 353/84, 30–34, 353/37, 20, 50, 51, 97, 98, 99, 7, 122; 349/5, 7–10; 348/742, 782, 784; 359/853, 858; 362/302, 346, 304, 305, 551

(56) References Cited

U.S. PATENT DOCUMENTS

| | | | |
|---|---|---|---|
| 5,491,525 A | 2/1996 | Yamasaki et al. ............. 353/98 |
| 5,601,351 A | 2/1997 | van den Brandt | |
| 5,625,738 A | * 4/1997 | Magarill ..................... 385/146 |
| 5,749,642 A | 5/1998 | Kimura et al. ................ 353/98 |
| 5,751,480 A | 5/1998 | Kitagishi | |
| 5,823,662 A | * 10/1998 | Conner ....................... 362/328 |
| 5,884,991 A | 3/1999 | Levis et al. | |
| 5,911,489 A | * 6/1999 | Watanabe .................... 353/98 |
| 5,975,703 A | 11/1999 | Holman et al. ............... 353/20 |
| 6,053,615 A | 4/2000 | Peterson et al. | |
| 6,056,405 A | * 5/2000 | Heintz et al. ................. 353/85 |
| 6,139,157 A | 10/2000 | Okuyuma | |
| 6,307,601 B1 | 10/2001 | Kakuda et al. ................ 349/5 |
| 6,505,939 B1 | * 1/2003 | Bierhuizen et al. ........... 353/94 |
| 6,565,235 B2 | * 5/2003 | Li ............................. 362/304 |
| 6,587,269 B2 | * 7/2003 | Li ............................. 359/497 |
| 6,609,798 B1 | * 8/2003 | Milinusic et al. ............. 353/98 |
| 6,619,820 B2 | * 9/2003 | Li ............................. 362/302 |
| 6,634,759 B1 | * 10/2003 | Li ............................. 359/853 |
| 6,672,740 B1 | * 1/2004 | Li ............................. 362/298 |
| 6,739,723 B1 | * 5/2004 | Haven et al. ................. 353/20 |
| 2003/0214617 A1 | * 11/2003 | Bierhuizen et al. ......... 349/113 |

* cited by examiner

Primary Examiner—Judy Nguyen
Assistant Examiner—Andrew Sever
(74) Attorney, Agent, or Firm—Rothwell, Figg, Ernst & Manbeck, PC

(57) ABSTRACT

A light recovery system for a projection display includes a reflector having a first and a second focal points. A source of electro-magnetic radiation at the first focal point emits rays of radiation that reflect from the reflector and converge substantially at the second focal point. A retro-reflector reflects radiation that does not impinge directly on the relector toward the reflector. An input surfacre of a light pipe is disposed proximate to the second focal point to collect and transmit sustantially all of the radiation. A first reflector is disposed proximate to an output surface of the light pipe to transmit a first band of radiation while reflecting a second and third bands of radiation. A second reflector transmits the second band of tadiationn while reflecting the first and third bands of radiation. A third reflector transmits the tird band of radiation while reflecting the first and second bands of radiation.

37 Claims, 14 Drawing Sheets

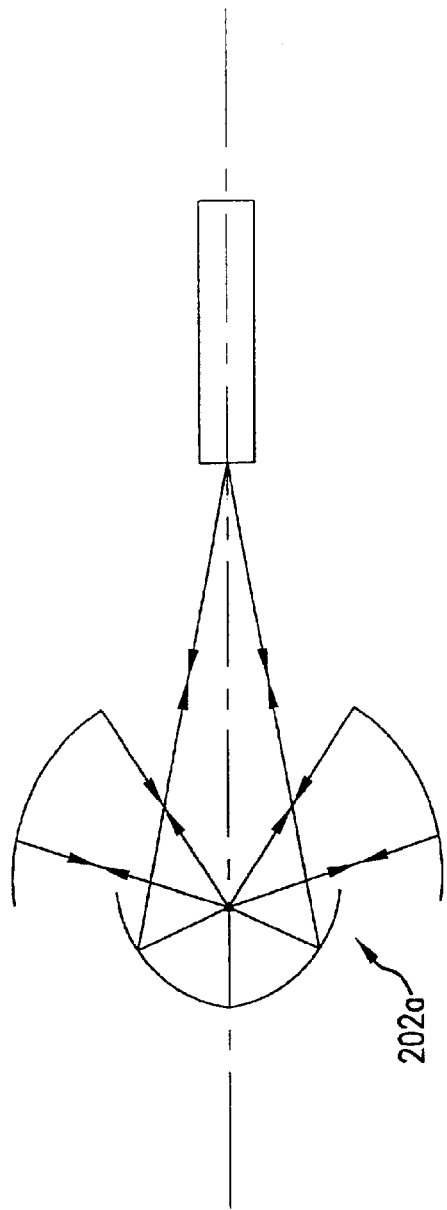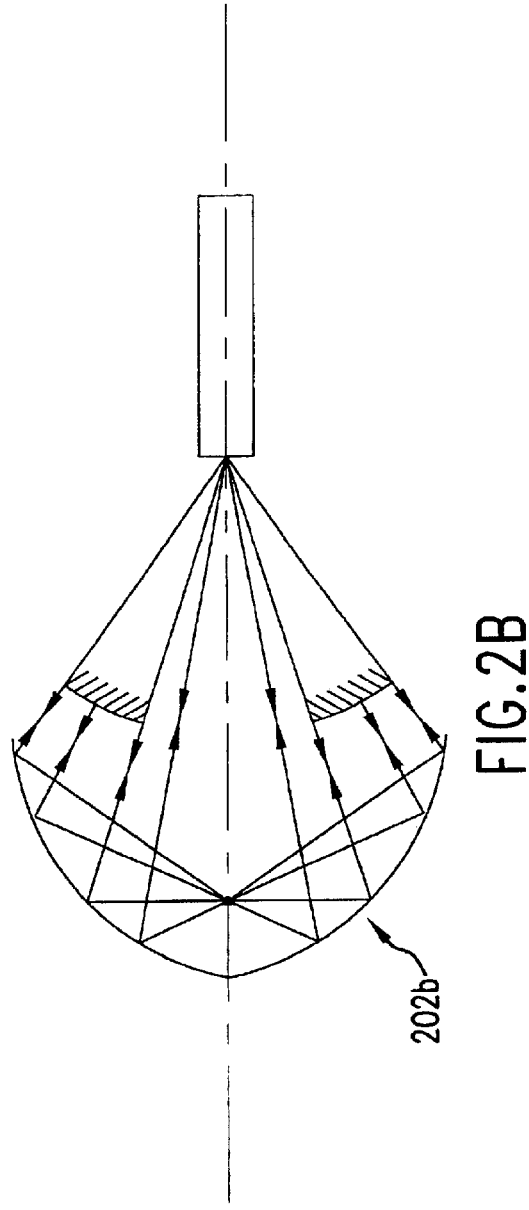

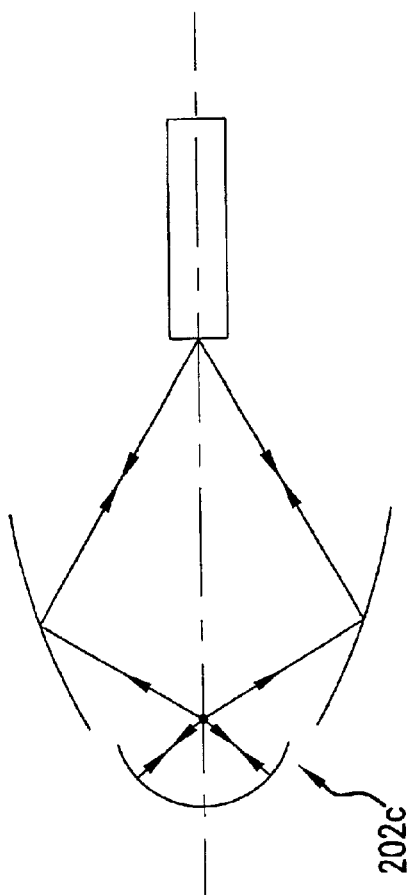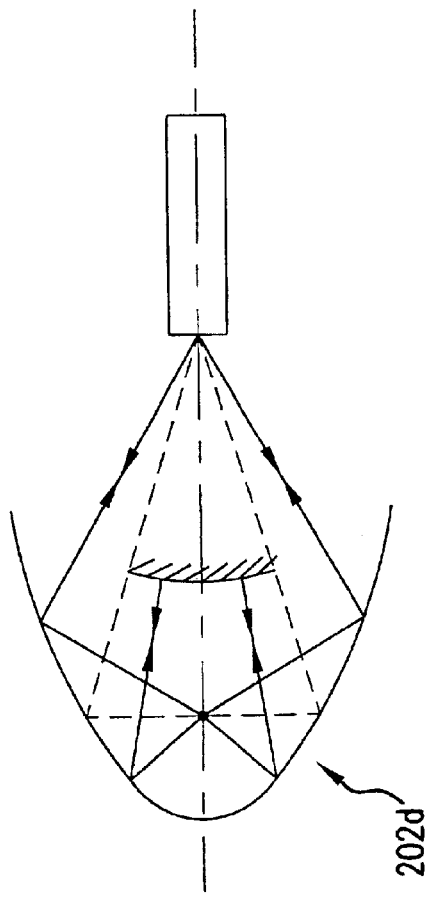

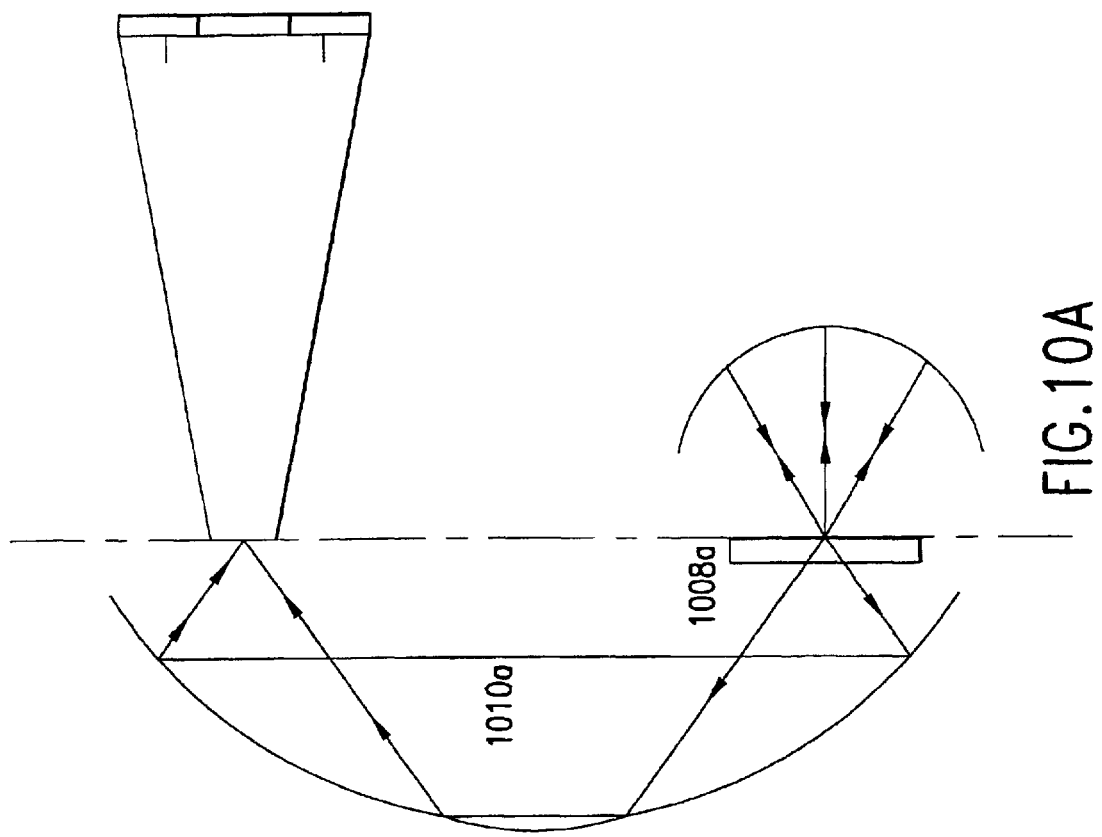

LIGHT RECOVERY FOR PROJECTION DISPLAYS

CROSS-REFERENCE TO RELATED APPLICATIONS

This application claims priority to Provisional Applications Ser. Nos. 60/286,006, filed Apr. 25, 2001, and 60/296,146, filed Jun. 7, 2001, the disclosures of which are incorporated by reference.

BACKGROUND OF THE INVENTION

1. Field of Invention

This invention relates to the recovery of light in projection systems that might otherwise be wasted.

2. Description of the Related Art

Projection displays work by projecting light onto, e.g. a screen. The light is arranged in patterns of colors or brightness and darkness, or both. The patterns are viewed by a viewer who assimilates them by associating the patterns with images with which the viewer may already be familiar, such as characters or faces. The patterns may be formed in various ways. One way is by modulating a beam of light with a stream of information.

Polarized light may be modulated by filtering it with polarized filters. An LCD imager may be used to perform the modulation, e.g. in LCD-type projection displays. LCD imagers may be, e.g. transmissive or reflective. The LCD imager may include pixels that may be modulated by altering their polarization to either match the polarization of the incident light or differ from it. The pixels will pass light, in general, if their polarization matches the polarization of the incident light.

If the polarization of the pixels is modulated with information, such as a pattern with which a viewer may be familiar, the information will be projected onto a screen as the presence or absence of light. When the pixels are modulated with information forming a pattern with which a viewer may be familiar, a viewer may recognize the pattern projected onto the screen.

Only half of the light from the source will be of the correct polarization to input to the LCD imager after the light is polarized. The other half will be of the incorrect polarization, and hence unusable directly. It would be desirable if light of the wrong polarization could be recovered and used.

Various schemes have been developed to convert the incorrectly polarized light to the correct polarization so that it may be used. The most common scheme uses an array of lenses and an array of polarization beam splitters (PBS). Another system involves the use of tapered light pipes and a PBS in which the polarization recovery is performed inside the light pipes. Such a system could be used with a 1:1 dual paraboloid coupling system.

In most of these systems, however, the output is collected at half the system etendue. The polarization recovery system then doubles the output etendue back to the system etendue. Since less light will be collected at half the system etendue, such a system is not as efficient as it could be. It would be desirable if the etendue could be maintained at its original size.

Colored light may also be used to illuminate imagers in projection displays. A color image may be produced by, e.g. spatially modulating several, e.g. three, colored beams of light incident on an imager and recombining them in desired proportions to produce an image. A range of colors may be produced by recombining the modulated beams in various proportions. A typical set of colored beams may be red, green, and blue (R, G, B), although other sets, such as, e.g. yellow, magenta, and cyan, may also be used.

If three colors are used, the three colored beams may be produced by three separate chips, such as three light emitting diodes (LED), each of which produces light in one of the colors. Such three-chip systems, however, may be mechanically and optically complex, and expensive. Systems having a single light source are often preferable to three-chip systems. It would be desirable to use a single chip to produce the light.

Light from a single light source, such as a single LED chip producing, e.g. white light, may used by splitting the light into three constituent color beams. Each beam is then spatially modulated by an imager and the three modulated beams are recombined to produce the desired color image, in the manner of the three-chip system. The beam from a single chip system may be split into three colors by using filters such as colored pixels or a color wheel. Such systems, however, may lose two-thirds of the total light to color filtering. It would be desirable if the light of the wrong color could be recovered and used.

Systems have been designed to ameliorate such filtering losses. One such system, produced by Koninklijke Philips Electronics N.V. (Philips), uses rotating prisms to scroll the beams across an imager. Red, green, and blue beams are produced by color separation filters. These beams form color bands on the imager and, with proper driver electronics, the appropriate pixels may be modulated according to the color bands' positions. The eye perceives a continuous color image if the colors are scrolled quickly enough.

A drawback of this system is that the etendue of the imager may be reduced by a factor of 3 to 5, depending on the tolerance of the system. This results in a reduction in light collection efficiency. A larger, more expensive chip may thus be required to compensate for the losses. It would be desirable if the etendue could be maintained, so that a larger chip was not necessary.

Texas Instruments, Inc. (TI) has a scrolling system that utilizes a spiral color wheel. The wheel scrolls color beams across an imager as in the Philips system. Some of the light reflected by the spiral color wheel is recaptured by reflecting it off the input surface of the light pipe. The light pipe has an input surface with an aperture to receive light focused onto the input surface by a reflector. The remainder of the input surface reflects the recaptured light back to the color wheel.

Since the aperture in the input surface is smaller than the available input surface, however, the brightness of the system is reduced, which increases the etendue of the output beam. In addition, some of the reflected light from the color wheel is lost through the input aperture. It would be desirable if the input surface were not limited in size to an input aperture.

SUMMARY OF THE INVENTION

In one embodiment the invention includes a light recovery system for a projection display with a reflector having a first and a second focal points. A source of electromagnetic radiation is disposed proximate to the first focal point of the reflector to emit rays of radiation that reflect from the reflector and converge substantially at the second focal point. A retro-reflector is disposed opposite the reflector to reflect at least a portion of the electromagnetic radiation that does not impinge directly on the reflector toward the reflector through the first focal point of the reflector to increase the flux intensity of the converging rays. A light pipe with an input surface and an output surface is disposed with the input surface proximate to the second focal point to collect and transmit substantially all of the radiation. A first reflector is disposed proximate to the output surface to transmit a first band of radiation while reflecting a second and third bands of radiation. A second reflector is disposed proximate to the output surface to transmit the second band of radiation while reflecting the first and third bands of radiation. A third reflector is disposed proximate to the output surface to transmit the third band of radiation while reflecting the first and second bands of radiation.

In a second embodiment the invention includes a light recovery apparatus for a projection display with a reflector having a first and a second focal points. A source of electromagnetic radiation is disposed proximate to the first focal point of the reflector to emit rays of radiation that reflect from the reflector and converge substantially at the second focal point. A retro-reflector is disposed opposite the reflector to reflect at least a portion of the electromagnetic radiation that does not impinge directly on the reflector toward the reflector through the first focal point of the reflector to increase the flux intensity of the converging rays. A light pipe with an input surface and an output surface is disposed with the input surface proximate to the second focal point to collect and transmit substantially all of the radiation. A PBS is disposed proximate to the output surface to collect and polarize substantially all of the radiation into a radiation of a first polarization and a second polarization. Radiation of the first polarization is transmitted, while radiation of the second polarization is reflected toward the output surface. A wave plate is disposed in a path of the radiation of the second polarization.

In a third embodiment the invention includes a method of polarization recovery composed of the steps of positioning a source of electromagnetic radiation at a first focal point of a reflector, producing rays of radiation by the source, reflecting a portion of the rays of radiation by the reflector toward a second focal point, converging substantially the rays of radiation at the second focal point, reflecting at least part of a portion of the rays of radiation that do not impinge directly on the reflector toward the reflector through the first focal point of the reflector, positioning an output light pipe having an input surface and an output surface so the input surface is substantially proximate to the second focal point, collecting substantially the rays of radiation at the input surface, passing the rays of radiation through the output light pipe, outputting rays of radiation from the output surface of the output light pipe, positioning a PBS proximate to the output surface, polarizing substantially the rays of radiation into radiation of a first polarization and radiation of a second polarization, transmitting substantially the radiation of the first polarization, reflecting substantially the radiation of the second polarization toward the output surface, collecting substantially the radiation of the second polarization at the output surface, passing the radiation of the second polarization through the output light pipe, outputting radiation of the second polarization from the input surface of the output light pipe, converging substantially the radiation of the second polarization at the second focal point, reflecting substantially a portion of the radiation of the second polarization by the reflector toward the first focal point, circularly polarizing substantially the radiation of the second polarization with a wave plate, converging substantially the circularly polarized radiation at the first focal point, reflecting substantially the circularly polarized radiation toward the reflector through the first focal point of the reflector, polarizing substantially the circularly polarized radiation into radiation of the first polarization, converging substantially the radiation of the first polarization at the second focal point, collecting substantially the radiation of the first polarization at the input surface, passing the radiation of the first polarization through the output light pipe, and outputting substantially radiation of the first polarization from the output surface of the output light pipe.

BRIEF DESCRIPTION OF THE SEVERAL VIEWS OF THE DRAWINGS

In FIGS. 2a–d are shown various reflector configurations for use with an embodiment of the invention;

In FIGS. 10a–c are shown various configurations of sources of electromagnetic radiation for use with an embodiment of the invention; and In FIG. 11 is shown a schematic diagram of a light recovery system for projection displays according to an seventh embodiment of the invention.

DETAILED DESCRIPTION OF THE PREFERRED EMBODIMENTS

Figure 1:
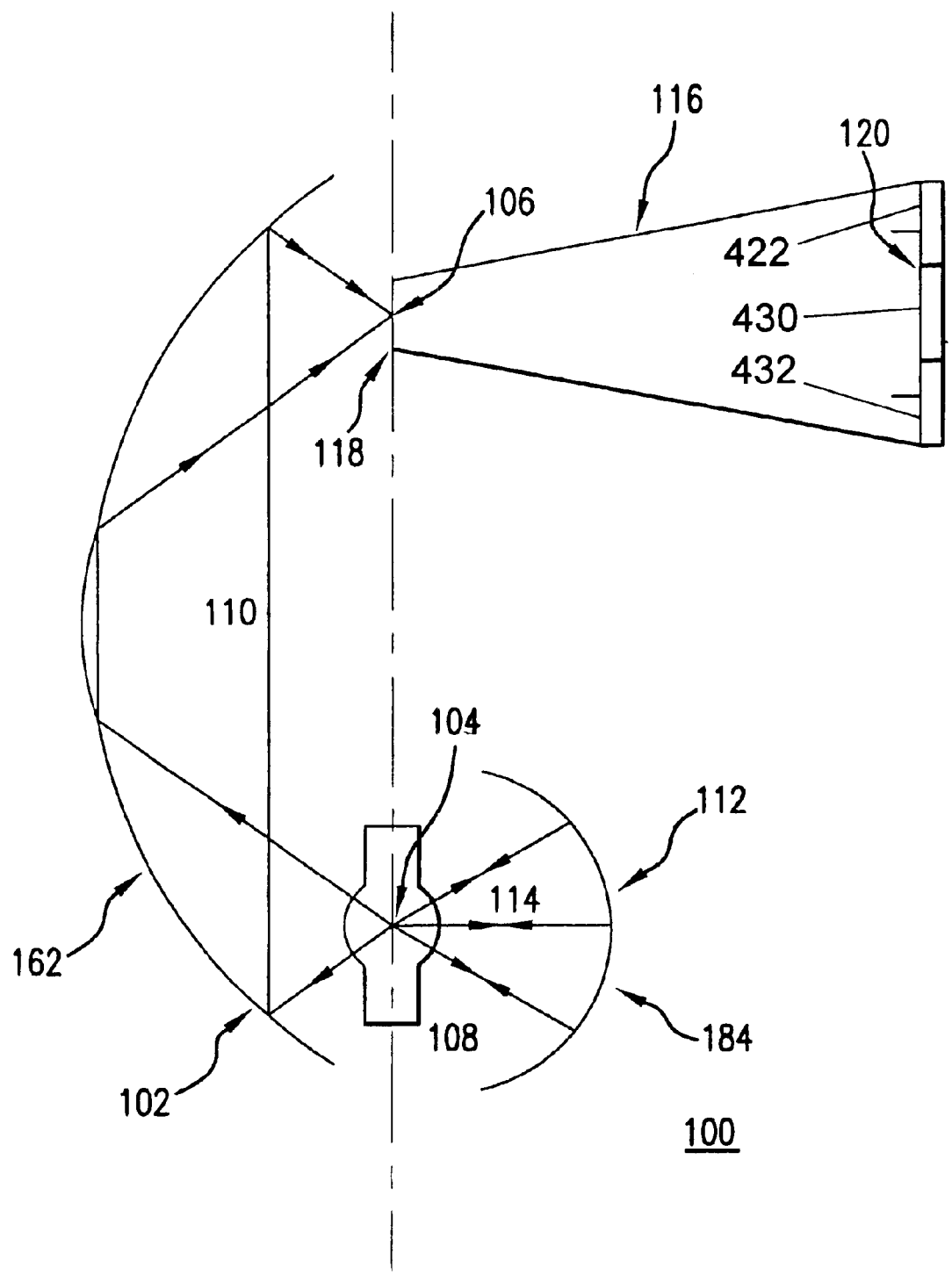
In FIG. 1 is shown a schematic diagram of a light recovery system for projection displays according to a first embodiment of the invention.

A light recovery system and apparatus 100 according to a first embodiment of the invention is shown in FIG. 1. Light recovery system and apparatus 100 includes a reflector 102 having first and second focal points 104, 106.

In one embodiment, as shown in FIG. 1, reflector 102 has a coating 162 that reflects only a pre-specified portion of the electromagnetic radiation spectrum. Coating 162 may reflect, e.g. infrared radiation, visible light, a pre-specified band of wavelengths of radiation, a specific color of radiation, or some combination thereof. In an alternative embodiment, coating 162 may, e.g. transmit infrared radiation or ultraviolet radiation instead of reflecting them. This might be used, e.g. to discard unusable non-visible radiation before it is coupled into an imager.

A source 108 of electro-magnetic radiation 110 is disposed proximate to first focal point 104 of reflector 102 to emit rays of electromagnetic radiation 110 that reflect from reflector 102 and converge substantially at second focal point 106. In one embodiment, source 108 of electromagnetic radiation 110 may be, e.g. an arc lamp, such as, e.g. a xenon lamp, a metal halide lamp, a high intensity discharge (HID) lamp, or a mercury lamp. In another embodiment, source 108 of electromagnetic radiation 110 may be, e.g. a halogen lamp, or a filament lamp.

In FIGS. 2a–2d are shown various configurations of reflectors 202 that may be used with an embodiment of the invention. Reflector 202 could be e.g. a portion of a substantially elliptical surface of revolution 202a, a portion of a substantially parabolic surface of revolution 202b, a portion of a substantially spherical surface of revolution 202c, or a portion of a substantially toric surface of revolution 202d.

In FIG. 10a is shown a source 1008a of electro-magnetic radiation 1010a which may be used with an embodiment of the invention. Source 1008a may be, e.g. a single-chip source of electromagnetic radiation, such as an LED emitting one range of bandwidths of radiation, such as, e.g. white light.

Figure 10B:
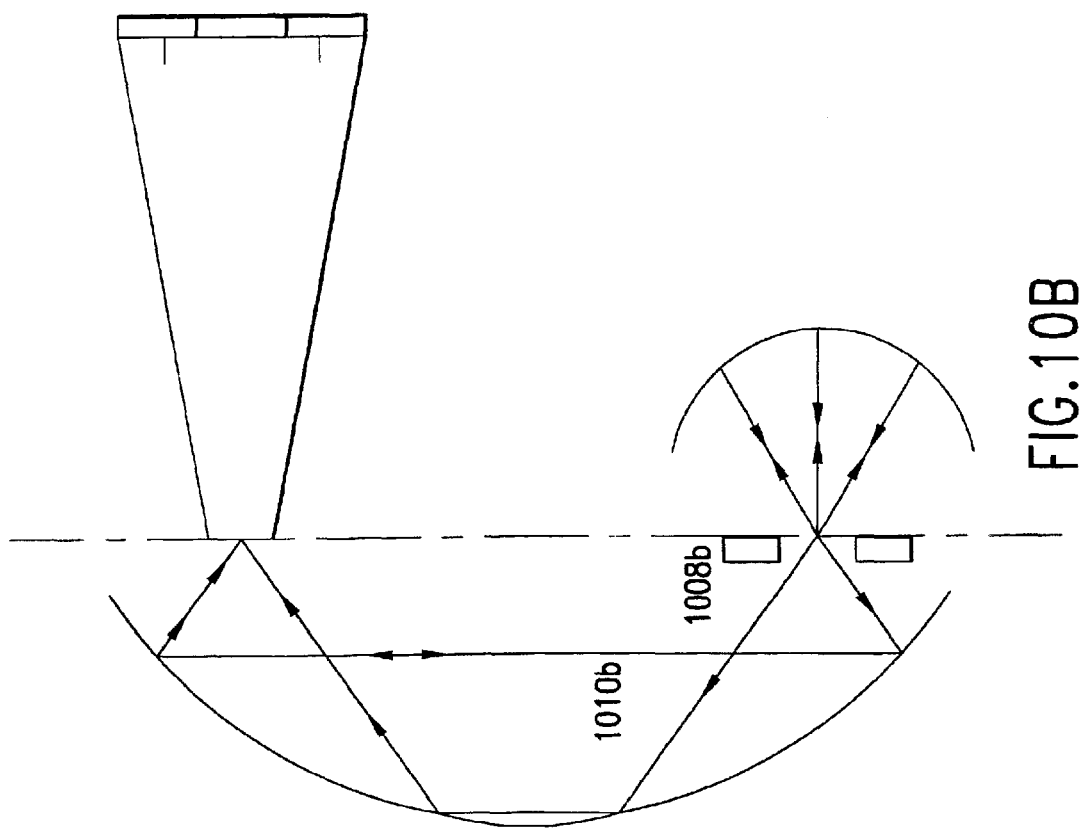

In FIG. 10b is shown a source 1008b of electro-magnetic radiation 1010b which may be used with an embodiment of the invention. Source 1008b of electromagnetic radiation 1010b may also be, e.g. a double-chip source of electromagnetic radiation, such as two LEDs emitting two ranges of bandwidths of radiation, such as, e.g. red and blue light, as shown in FIG. 10b.

Figure 10C:
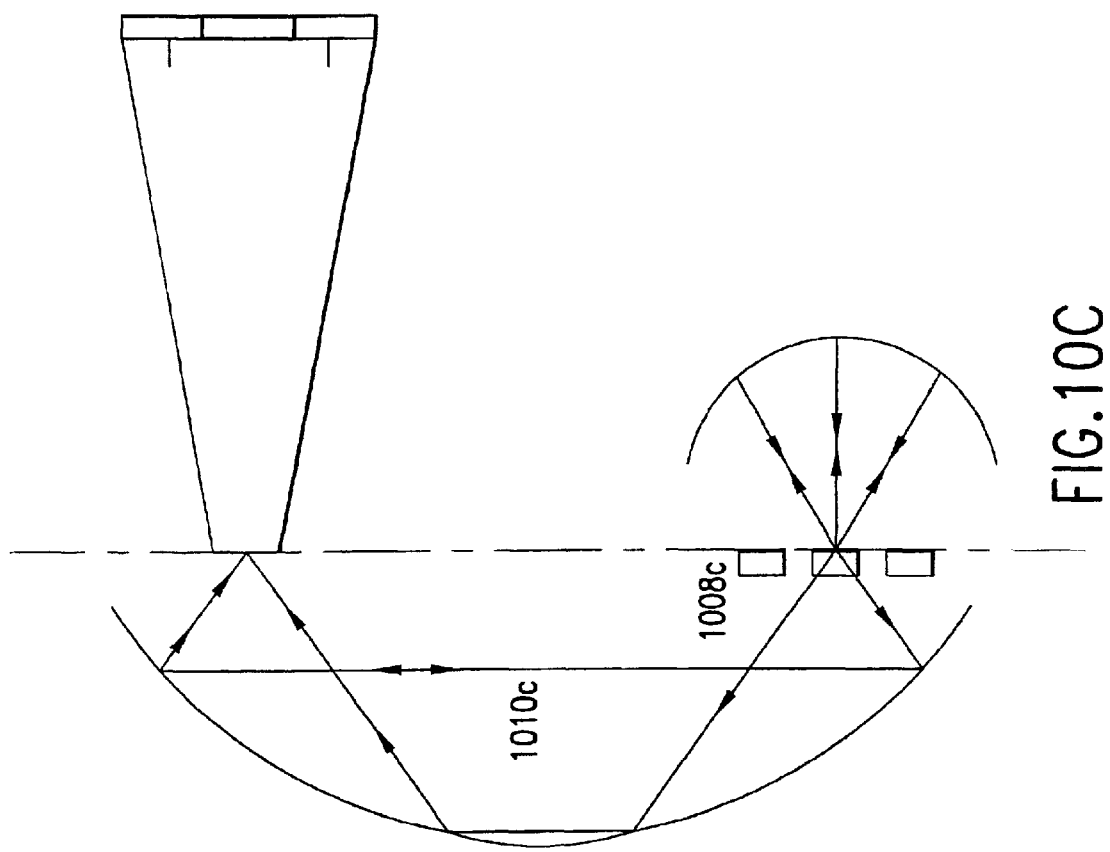

In FIG. 10c is shown a source 1008c of electro-magnetic radiation 1010c which may be used with an embodiment of the invention. Source 1008c of electromagnetic radiation 1010c may also be, e.g. a triple-chip source of electromagnetic radiation, such as three LEDs emitting three ranges of bandwidths of radiation, such as, e.g. red, green, and blue light, as shown in FIG. 10c.

A retro-reflector 112 is disposed opposite reflector 102, as shown in FIG. 1, to reflect at least a portion 114 of electromagnetic radiation 110 that does not impinge directly on reflector 102 toward reflector 102 through first focal point 104 of reflector 102 or primary reflector 356 to increase the flux intensity of the converging rays. Retro-reflector 112 may be, e.g. a spherical retro-reflector 112 disposed on a side of source 108 opposite reflector 102 or primary reflector 356. In one embodiment, retro-reflector 112 is integral to reflector 102. In another embodiment, retro-reflector 112 has a coating 184 that reflects only a pre-specified portion of the electromagnetic radiation spectrum. Coating 184 may reflect, e.g. infrared radiation, visible light, a pre-specified band of wavelengths of radiation, a specific color of radiation, or some combination thereof.

Light recovery system and apparatus 100 also includes a light pipe 116 having an input surface 118 and an output surface 120. Light pipe 116 may be, e.g. a tapered light pipe (TLP) or a straight light pipe (SLP). Light pipe 116 could be made of, e.g. quartz, glass, plastic, or acrylic. The dimensions of input surface 118 and an output surface 120 may be selected such that, e.g. the output numerical aperture (NA) is matched to a device receiving radiation 110. If the device is, e.g. a polarized beam splitter (PBS), the NA should be small enough for efficient operation of the polarizer.

Input surface 118 is disposed proximate to second focal point 106 to collect and transmit substantially all of radiation 110. In a preferred embodiment, the entire expanse of input surface 118 may be, e.g. substantially transmissive.

Figure 3:
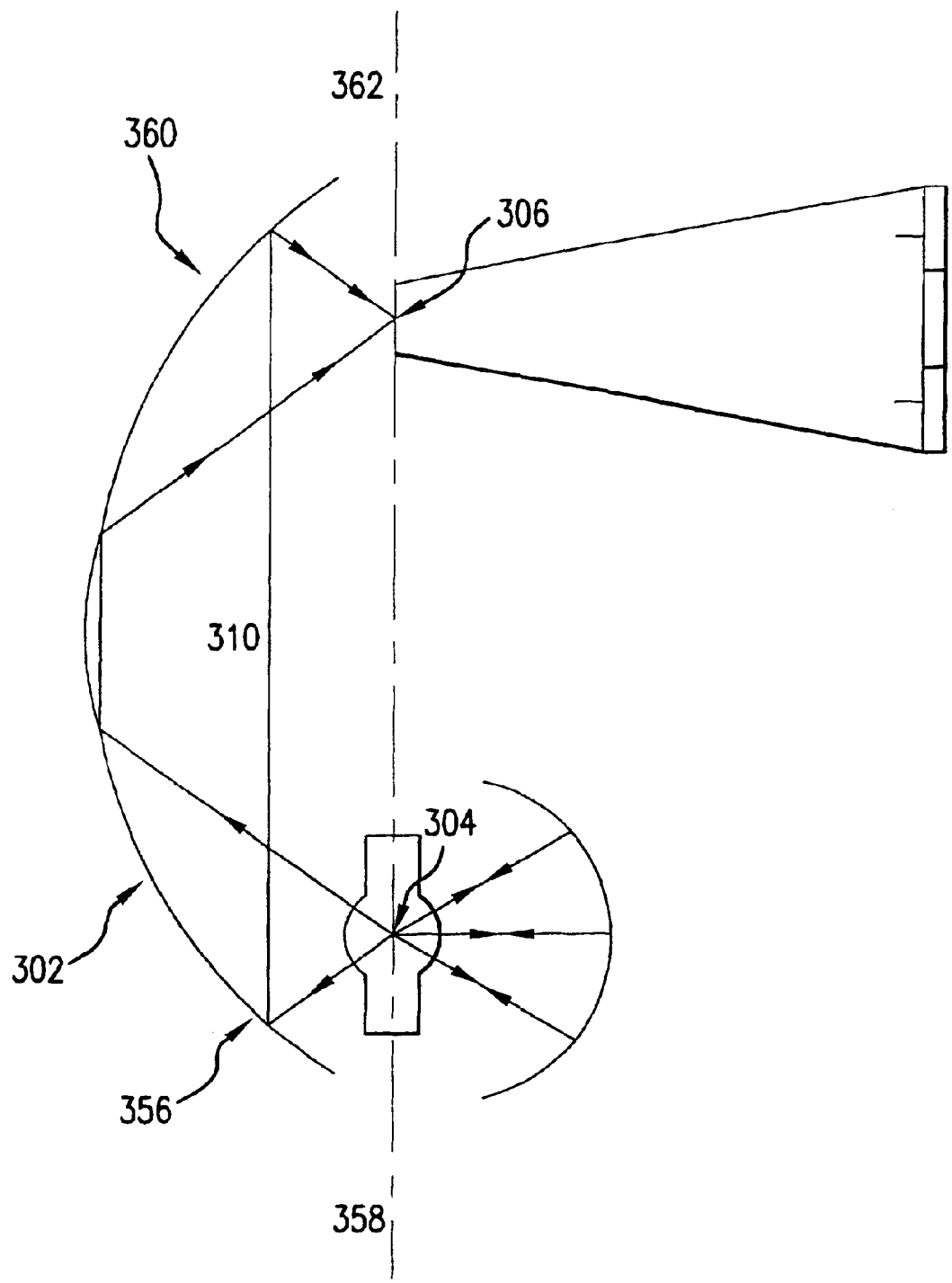
In FIG. 3 is shown a schematic diagram of a light recovery system for projection displays according to a second embodiment of the invention.

In a second embodiment, shown in FIG. 3, reflector 302 may be composed of, e.g. a primary reflector 356 having a first optical axis 358 and a secondary reflector 360 having a second optical axis 362. Secondary reflector 360 may be placed substantially symmetrically to primary reflector 356, with first optical axis 358 being substantially co-linear with second optical axis 362. First focal point 304 is a focal point of primary reflector 356 while second focal point 306 is a focal point of secondary reflector 360. Rays of radiation 310 reflect from primary reflector 356 toward secondary reflector 360 and converge substantially at second focal point 306.

In one embodiment, primary and secondary reflectors 356, 360 may comprise, e.g. at least a portion of a substantially elliptical surface of revolution or a substantially parabolic surface of revolution. In another embodiment, primary reflector 356 may comprise, e.g. at least a portion of a substantially elliptical surface of revolution while secondary reflector 360 may comprise, e.g. at least a portion of a substantially hyperbolic surface of revolution. In a further embodiment, primary reflector 356 may comprise, e.g. at least a portion of a substantially hyperbolic surface of revolution while secondary reflector 360 may comprise, e.g. at least a portion of a substantially elliptical surface of revolution.

Figure 4:
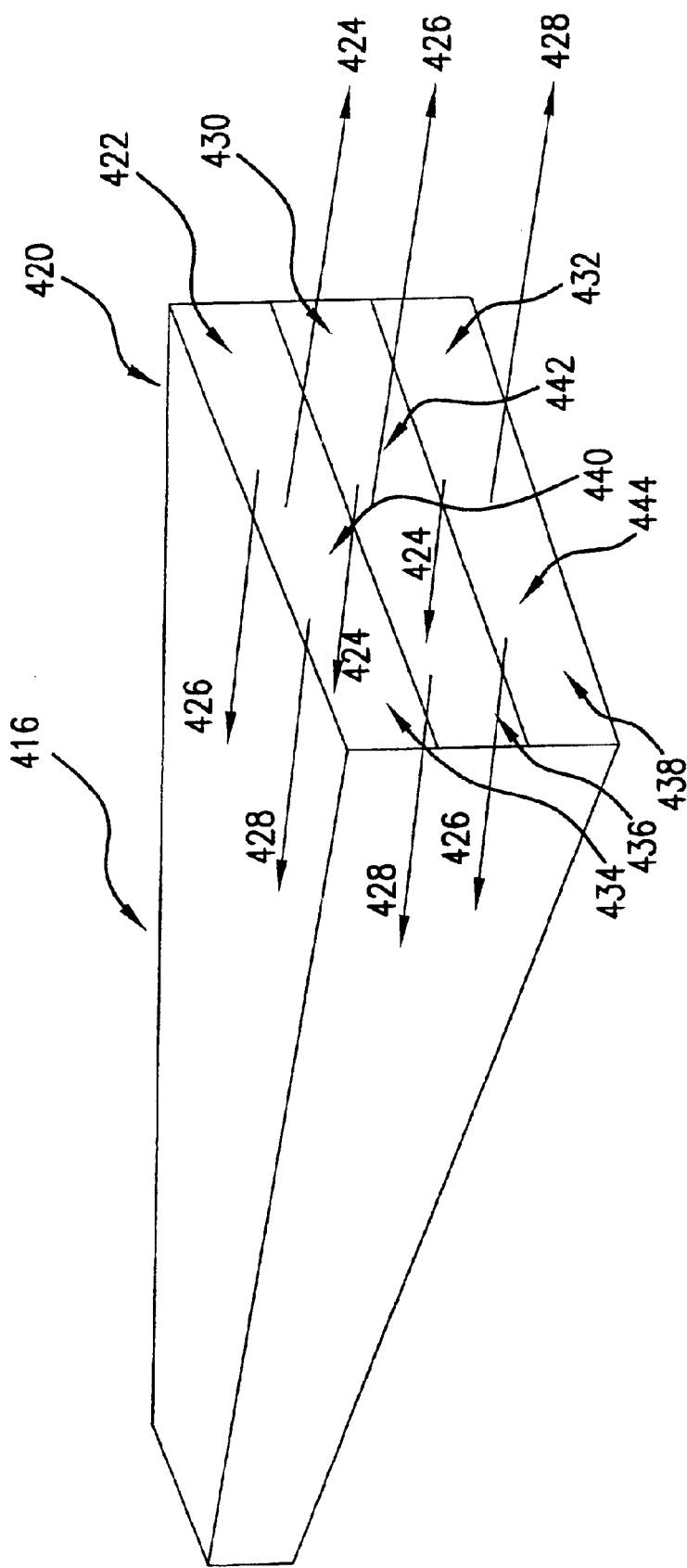
In FIG. 4 is shown a light pipe for use with an embodiment of the invention.

In FIG. 4 is shown a light pipe 416 for use with an embodiment of the invention. In one embodiment, as shown in FIG. 4, a first reflector 422 is disposed proximate to output surface 420 of light pipe 416. First reflector 422 transmits a first band of radiation 424 while reflecting second and third bands of radiation 426, 428. A second reflector 430 is also disposed proximate to output surface 420, near first reflector 422. Second reflector 430 transmits second band of radiation 426 while reflecting first and third bands of radiation 424, 428. A third reflector 432 is also disposed proximate to output surface 420, near first and second reflectors 422, 430. Third reflector 432 transmits third band of radiation 428 while reflecting first and second bands of radiation 424, 426.

First, second, and third bands of radiation 424, 426, 428 might be, e.g. red, orange, yellow, green, blue, indigo, violet, pink, white, magenta, infrared, or ultra-violet radiation. In a preferred embodiment first, second, and third bands of radiation 424, 426, 428 are red, green, and blue radiation, in no particular order.

In a preferred embodiment, first, second, and third reflectors 422, 430, and 432 are placed parallel to each other, although they could overlap somewhat. In one embodiment, output surface 420 could be, e.g. divided into a first, second, and third areas 434, 436, 438. In this case first reflector 422 could be, e.g. a first reflective coating 440 over first area 434. Second reflector 430 could be, e.g. a second reflective coating 442 over second area 436. Third reflector 432 could be, e.g. a third reflective coating 444 over third area 438.

Figure 5:
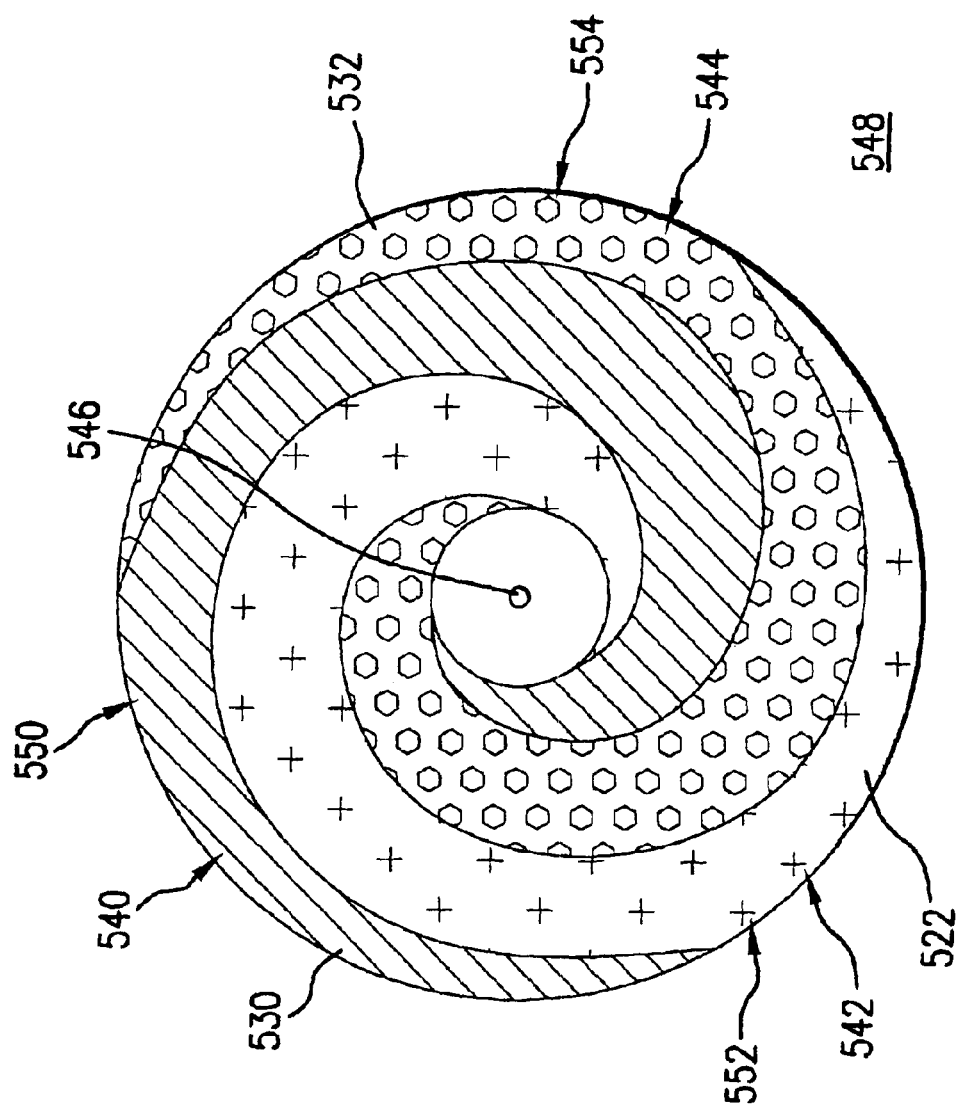
In FIG. 5 is shown a color wheel for use with an embodiment of the invention.

In another embodiment, shown in FIG. 5, first, second, and third reflectors 522, 530, and 532 could be, e.g. distributed around a shaft 546, in the manner of a color wheel 548. Color wheel 548 may be, e.g. rotatably mounted on shaft 546 and have a surface composed of a first, second, and third areas 550, 552, 554 disposed spirally about shaft 546. In this case first reflector 522 could be, e.g. a first reflective coating 540 over first area 550. Second reflector 530 could be, e.g. a second reflective coating 542 over second area 552. Third reflector 532 could be, e.g. a third reflective coating 544 over third area 554.

Figure 11:
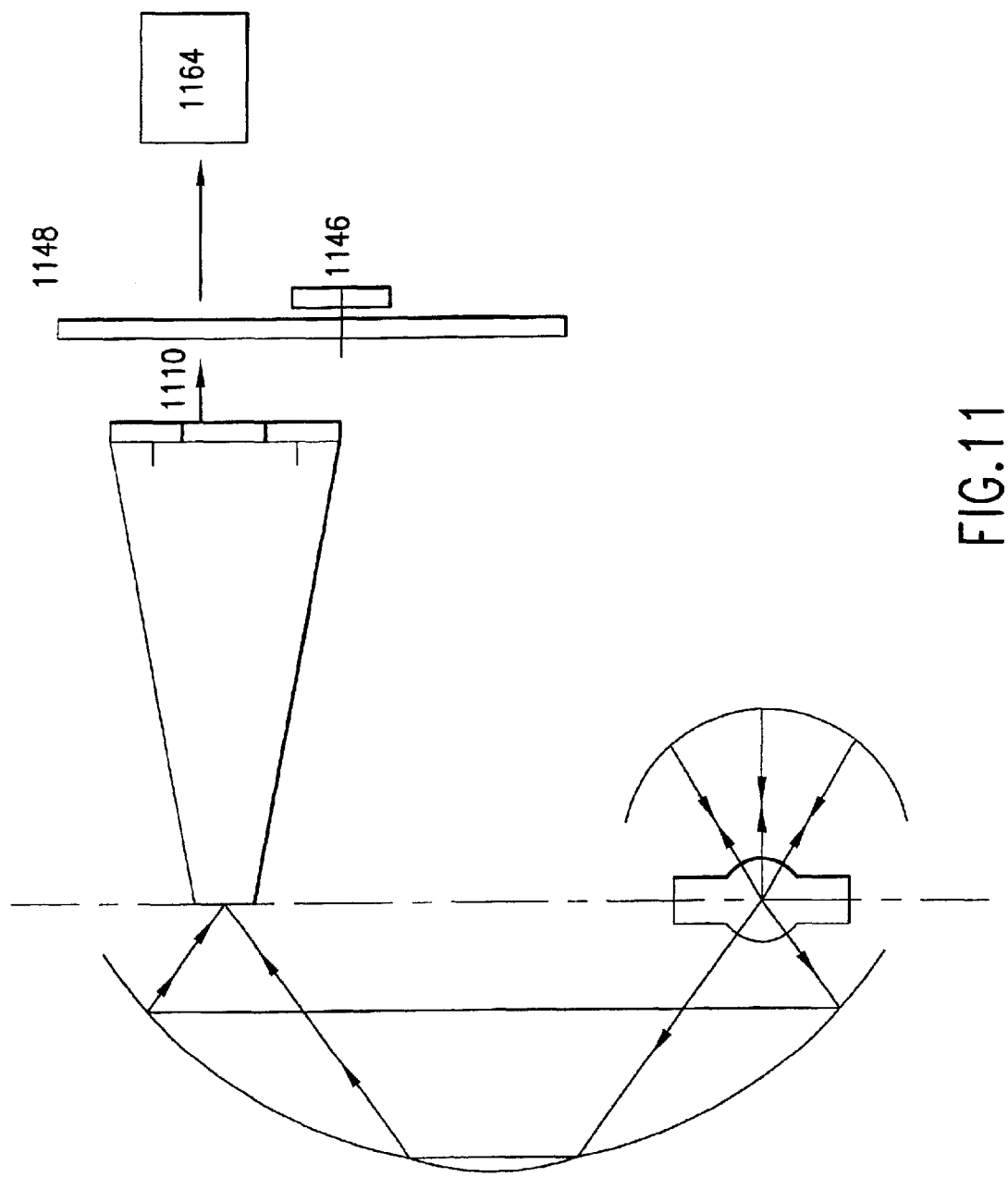

In a seventh embodiment of the invention, as shown in FIG. 11, color wheel 1148 may be, e.g. rotated by an electric motor turning shaft 1146, Radiation 1110 incident on color wheel 1148 may go through a sequence as color wheel 1148 rotates, producing scrolling color bands. The scrolling color bands may be collected and focused onto an image projection system 1164. The imager may be synchronized to the color wheel and modulated, thus producing an image that may be projected onto a screen.

Figure 6:
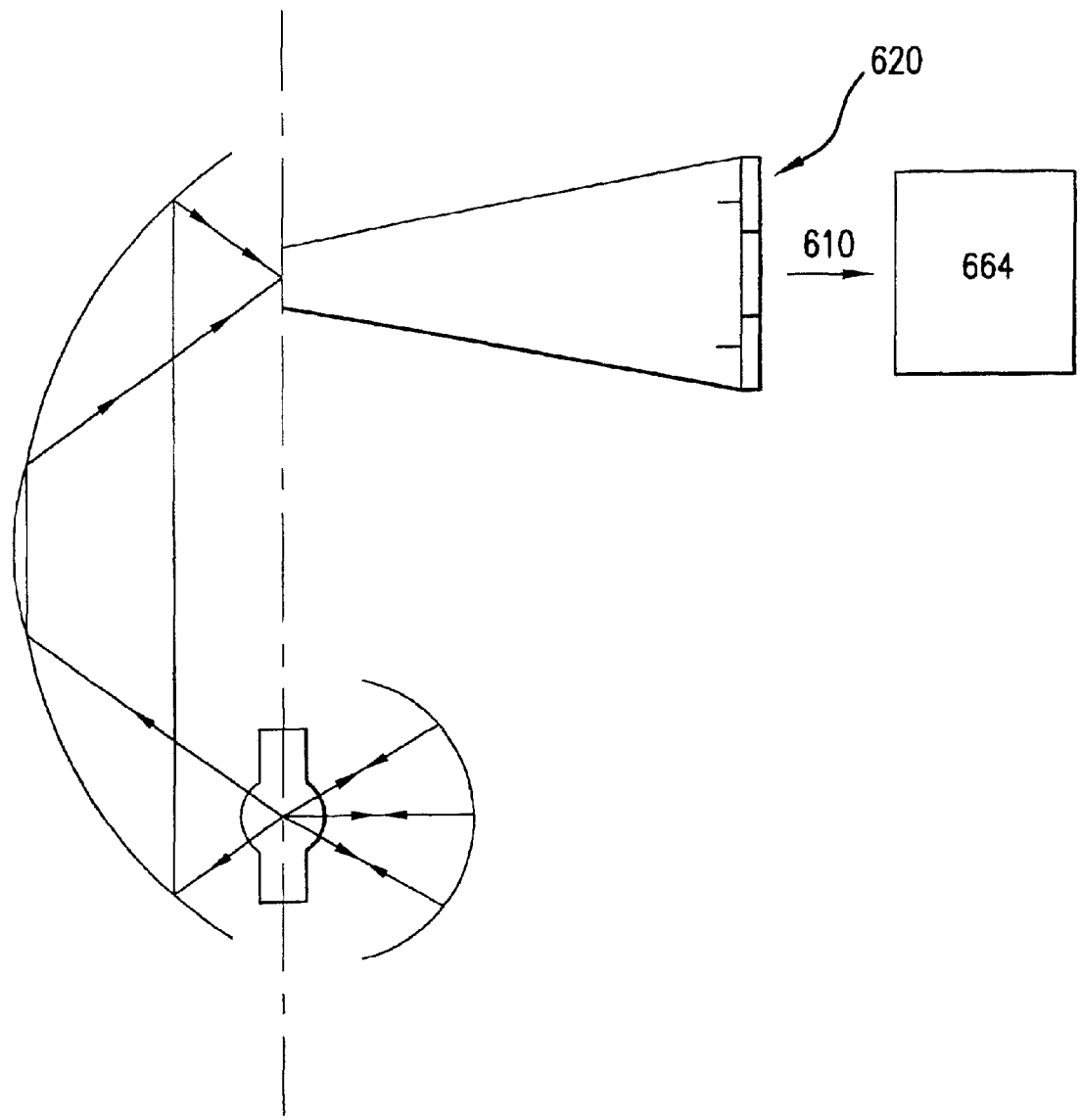
In FIG. 6 is shown a schematic diagram of a light recovery system for projection displays according to a third embodiment of the invention.

In a third embodiment of the invention, as shown in FIG. 6, an image projection system 664 may be disposed proximate to output surface 620 to collect substantially all of radiation 610. Image projection system 664 may be, e.g. a liquid crystal on silicon (LCOS) imager, a digital micromirror device (DMD) chip, or a transmissive liquid crystal display (LCD) panel.

Figure 7:
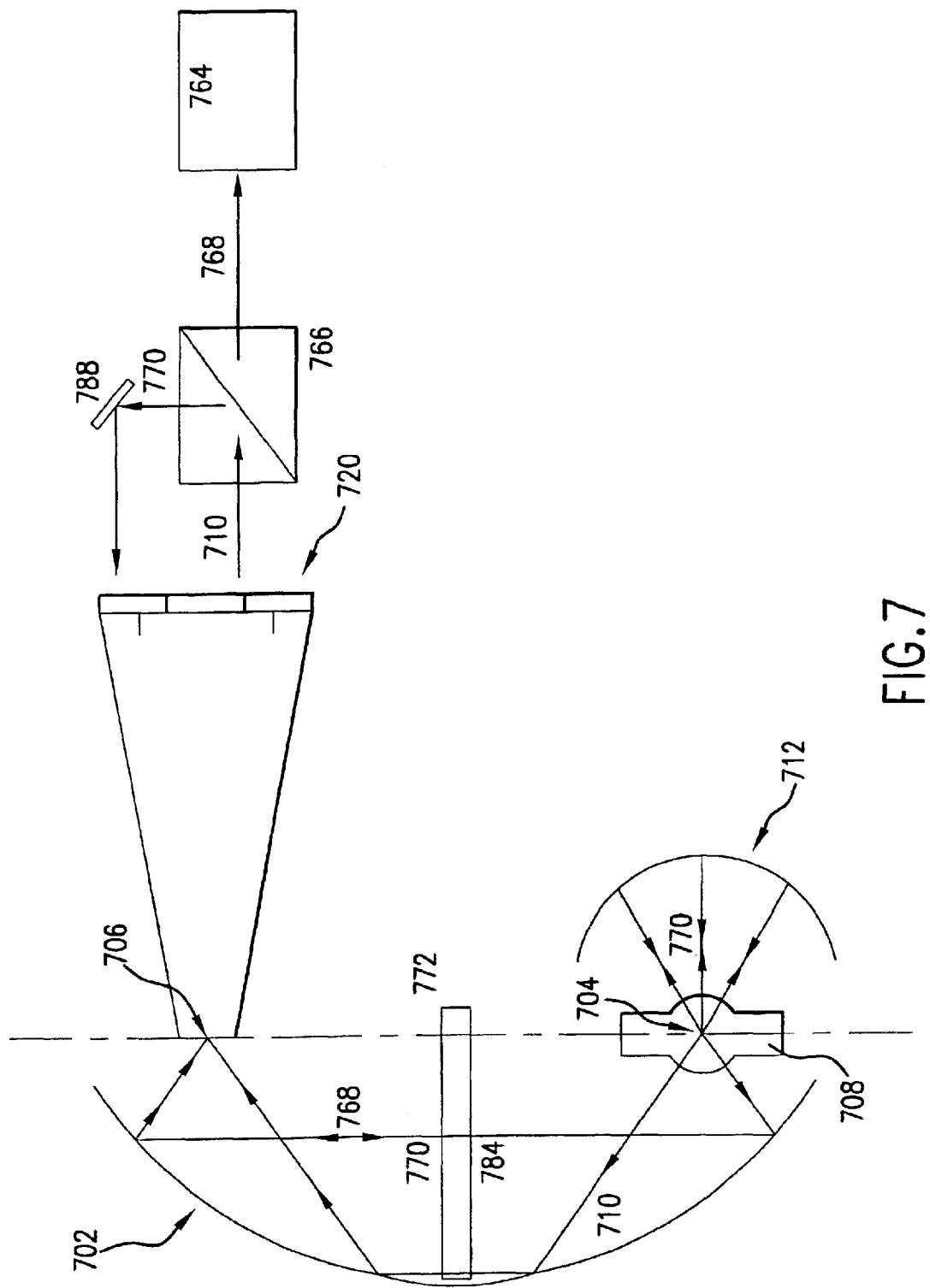
In FIG. 7 is shown a schematic diagram of a light recovery system for projection displays according to a fourth embodiment of the invention In FIG. 8 is shown a schematic diagram of a light recovery system for projection displays according to a fifth embodiment of the invention.

In a fourth embodiment of the invention, as shown in FIG. 7, a PBS 766 may be disposed mediate between output surface 720 and image projection system 764 to collect and polarize substantially all of radiation 710 into a first polarization 768 and a second polarization 770. For example, radiation of first polarization 768 may be, e.g. p-polarized radiation, while radiation of second polarization 770 may be, e.g. s-polarized radiation. The order of polarizations may, of course, be reversed. In one embodiment, PBS 766 may be, e.g. a wire-grid polarizer. In other embodiments, PBS 766 may be, e.g. a one-dimensional array or a two-dimensional array.

A PBS 766 might be used if, e.g. image projection system 764 was of a type that required polarized light, such as, e.g. an LCOS imager. In this case, if image projection system 764 were constructed and arranged to, e.g. utilize radiation of first polarization 768, p-polarized radiation 768 may be transmitted to image projection system 764 while s-polarized radiation 770, which is unusable by image projection system 764 directly, is reflected substantially back towards output surface 720 by, e.g. a return reflector 788.

S-polarized radiation 770 will be, e.g. collected substantially at output surface 720 and returned through second focal point 706 to reflector 702, and ultimately to first focal point 704. Some of s-polarized radiation 770 may pass through first focal point 704 and be reflected by retro-reflector 712. There will be substantially no loss of etendue since the recovered s-polarized radiation 770 follows a path through first focal point 704 and thus appears to be emitted by source 708.

A wave plate 772 may be, e.g. disposed in a path of s-polarized radiation 770. Wave plate 772 may be, e.g. disposed proximate to an interior 774 of reflector 702. In a preferred embodiment, wave plate 772 may be, e.g. a quarter-wave plate. If wave plate 772 were a quarter-wave plate, s-polarized radiation 770 will be circularly polarized as it passes through wave plate 772, producing circularly polarized radiation 784. Circularly polarized radiation 784 may pass substantially through first focal point 704 and be reflected by retro-reflector 712. Radiation 710 emitted by source 708 towards the reflector 702 may be combined with circularly polarized radiation 784 reflected by the retro-reflector 712 and collimated by reflector 702. Wave plate 772 provides no net change to radiation 710 since radiation 710 is unpolarized. Circularly polarized radiation 784, on the other hand, is polarized to p-polarized radiation 768 when it passes wave-plate 772 the second time.

Depolarization of s-polarized radiation 770 may occur at various interfaces as s-polarized radiation 770 traverses the path from the PBS 766 to the retro-reflector 712 and back, due to aberrations and imperfections in the system 700. As a result, s-polarized radiation 770 reflected by PBS 766 may not be totally converted to p-polarized radiation 768 on the first pass. The portion of the radiation 768 that is not p-polarized will be reflected by the PBS 766 and go through the conversion process again. The reflected s-polarization light that undergoes, e.g. a round trip to the retro-reflector 712 and back will be reflected five times and traverse a glass-air interface between components eight times. If we assume a reflectivity of the mirrors of 0.98, and a Fresnel loss at each glass-air interface of 1%, the round trip efficiency becomes 65%. Assuming a single round of recovery and 15% and 80% polarization efficiencies for first and second rounds respectively, the total output efficiency is 15%+0.45*0.80*0.65=68%. If the reflected light is assumed to be totally unpolarized during the second trip, the total output efficiency is 15%+0.45*0.45*0.45=58%.

In most systems the output of the systems is collected at half the system etendue and the polarization recovery systems double the output etendue back to the system etendue. The theoretical improvement of this system and apparatus 700 is comparable to those systems that double the etendue. Since less light will be collected at half the system etendue, system and apparatus 700 works out to be more efficient than those systems that double the etendue.

If source 708 is, e.g. a halogen or a filament lamp, s-polarized radiation 770 may be used to add heat to the filament and increase radiation output. If the components of system 700 are aligned accurately enough that substantially all of s-polarized radiation 770 heats the filament, wave plate 772 can be omitted. The extra radiation produced by this process will not be polarized, eliminating the need for wave plate 772. If, however, the alignment is such that part or all of s-polarized radiation 770 does not heat the filament, but instead passes through the filament and is reflected back to reflector 702 by the retro-reflector 712, this radiation may still be polarized, and wave plate 772 may be required.

Figure 8:
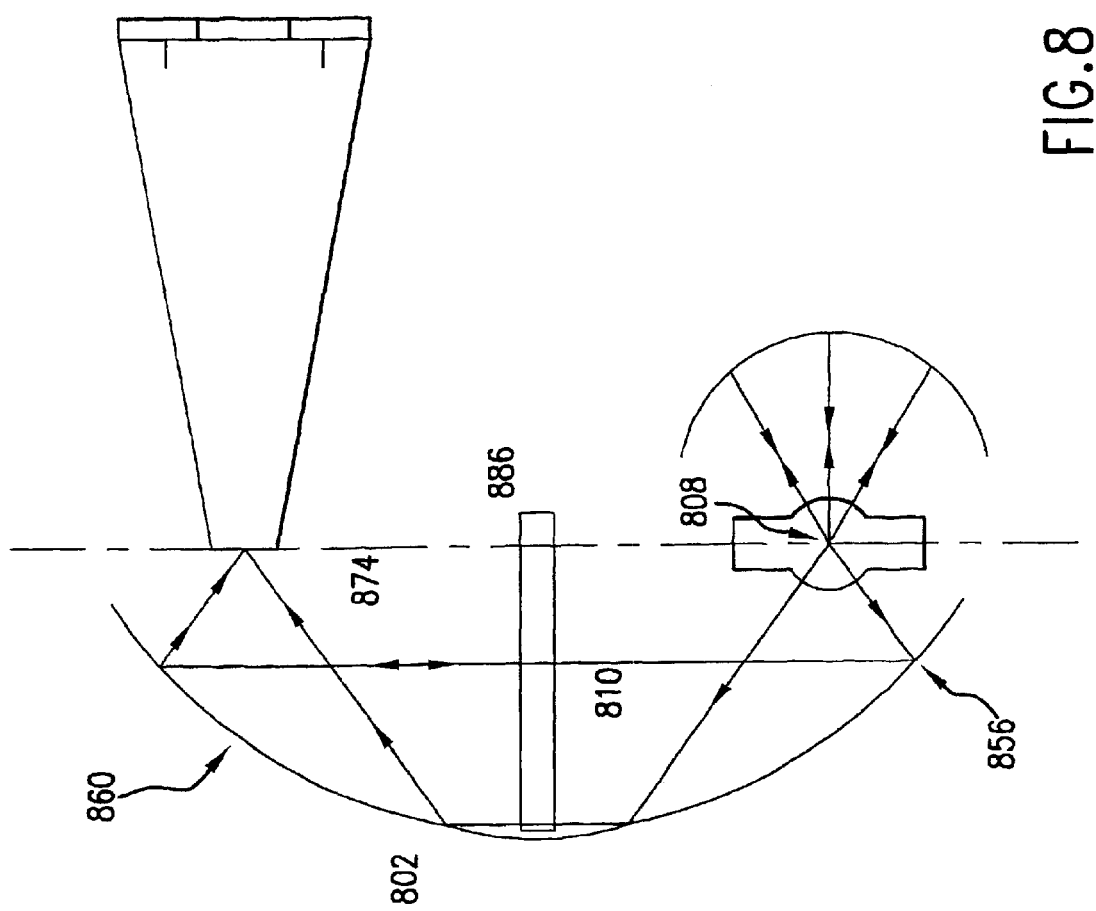

In a fifth embodiment of the invention, as shown in FIG. 8, source 808 may be, e.g. a filament lamp. In this case an infrared reflector 886 may be disposed e.g. in a path of radiation 810 to reflect an infrared component of radiation 810 back toward source 808 to add heat to the filament and increase radiation output. Infrared reflector 886 may be placed, e.g. in an interior 874 of reflector 802, such as, e.g. mediate between reflector 802 and source 808. Infrared reflector 886 may also be placed, e.g. between primary reflector 856 and secondary reflector 860, in a path of radiation 810.

Figure 9:
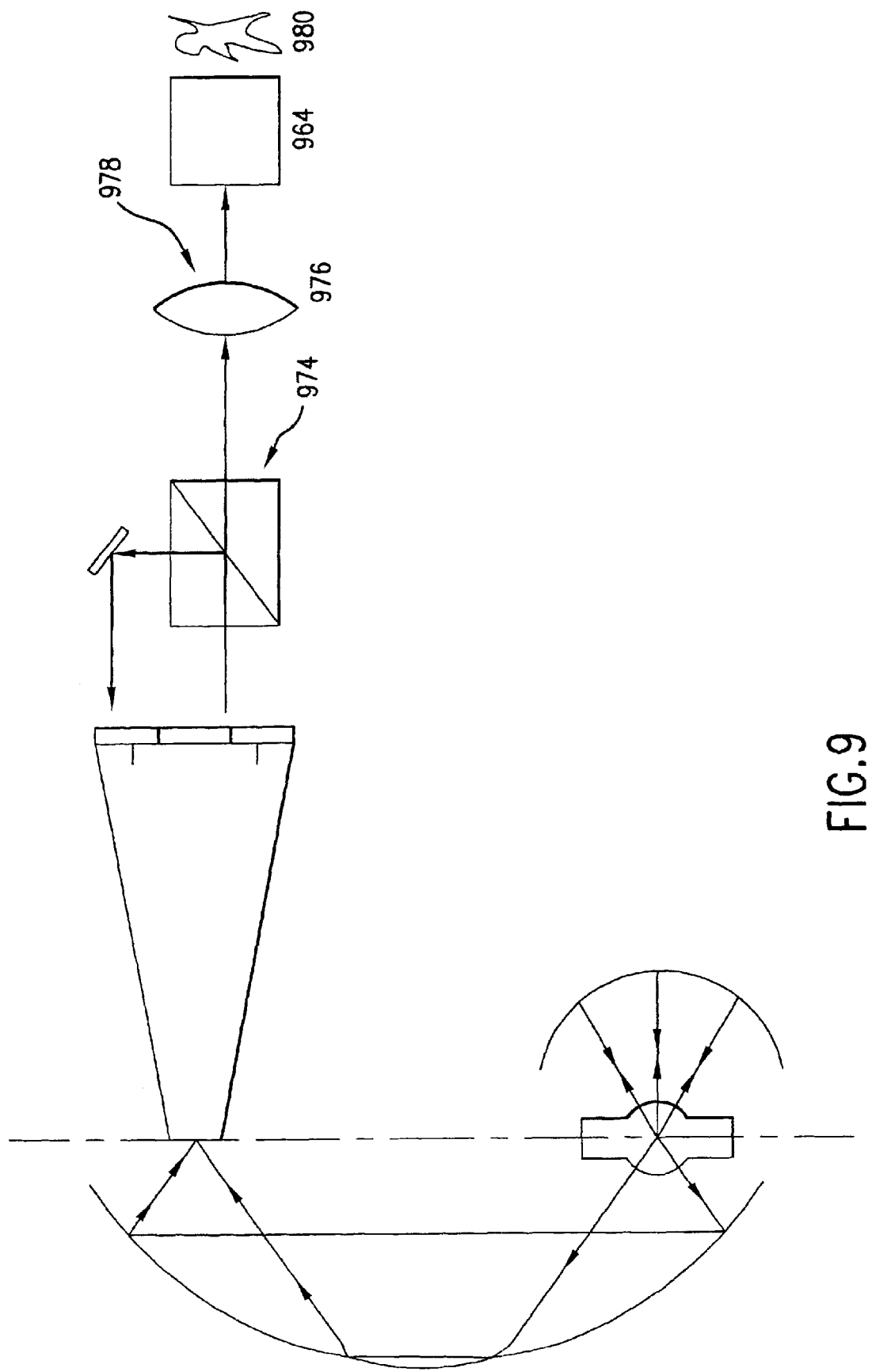
In FIG. 9 is shown a schematic diagram of a light recovery system for projection displays according to a sixth embodiment of the invention.

In a sixth embodiment of the invention, as shown in FIG. 9, a focusing lens 976 may be disposed proximate to an output surface 974 of PBS 966, with image projection system 964 disposed proximate to an output side 978 of focusing lens 976. An image 980 illuminated by the radiation 968 collected and focused at focusing lens 976 will be released by the projection system 964 to display the image 980.

An eighth embodiment of the invention includes a method of polarization recovery composed of the steps of positioning a source of electromagnetic radiation at a first focal point of a reflector, producing rays of radiation by the source, reflecting a portion of the rays of radiation by the reflector toward a second focal point, converging substantially the rays of radiation at the second focal point, reflecting at least part of a portion of the rays of radiation that do not impinge directly on the reflector toward the reflector through the first focal point of the reflector, positioning an output light pipe having an input surface and an output surface so the input surface is substantially proximate to the second focal point, collecting substantially the rays of radiation at the input surface, passing the rays of radiation through the output light pipe, outputting rays of radiation from the output surface of the output light pipe, positioning a PBS proximate to the output surface, polarizing substantially the rays of radiation into radiation of a first polarization and radiation of a second polarization, transmitting substantially the radiation of the first polarization, reflecting substantially the radiation of the second polarization toward the output surface, collecting substantially the radiation of the second polarization at the output surface, passing the radiation of the second polarization through the output light pipe, outputting radiation of the second polarization from the input surface of the output light pipe, converging substantially the radiation of the second polarization at the second focal point, reflecting substantially a portion of the radiation of the second polarization by the reflector toward the first focal point, circularly polarizing substantially the radiation of the second polarization with a wave plate, converging substantially the circularly polarized radiation at the first focal point, reflecting substantially the circularly polarized radiation toward the reflector through the first focal point of the reflector, polarizing substantially the circularly polarized radiation into radiation of the first polarization, converging substantially the radiation of the first polarization at the second focal point, collecting substantially the radiation of the first polarization at the input surface, passing the radiation of the first polarization through the output light pipe, and outputting substantially radiation of the first polarization from the output surface of the output light pipe.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A light recovery system for a projection display comprising:
   a reflector having a first and a second focal points;
   a source of electro-magnetic radiation disposed proximate to said first focal point of said reflector to emit rays of radiation that reflect from said reflector and converge substantially at said second focal point;
   a retro-reflector disposed opposite said reflector to reflect at least a portion of the electromagnetic radiation that does not impinge directly on said reflector toward said reflector through the first focal point of said reflector to increase the flux intensity of the converging rays;
   a light pipe having an input surface and an output surface, said input surface of said light pipe disposed proximate to said second focal point to collect and transmit substantially all of said radiation;
   a first reflector disposed proximate to said output surface, said first reflector transmitting a first band of said radiation and reflecting a second and third bands of said radiation;
   a second reflector disposed proximate to said output surface, said second reflector transmitting said second band of said radiation and reflecting said first and third bands of said radiation; and
   a third reflector disposed proximate to said output surface, said third reflector transmitting said third band of said radiation and reflecting said first and second bands of said radiation.

2. The light recovery system of claim 1, wherein said output surface comprises a first, second, and third areas; and
   said first reflector is a first reflective coating over said first area;
   said second reflector is a second reflective coating over said second area; and
   said third reflector is a third reflective coating over said third area.

3. The light recovery system of claim 1, comprising further a color wheel rotatably mounted on a shaft and having a surface comprising a first, second, and third areas disposed spirally about said shaft; and
   wherein all of said input surface is substantially transmissive;
   said first reflector is a first reflective coating over said first area;
   said second reflector is a second reflective coating over said second area; and
   said third reflector is a third reflective coating over said third area.

4. The light recovery system of claim 1, wherein said light pipe is comprised of a material selected from the group consisting of quartz, glass, plastic, or acrylic.

5. The light recovery system of claim 1, wherein said light pipe is selected from the group consisting of:
   an SLP, and
   a TLP.

6. The light recovery system of claim 1, wherein said reflector comprises at least a portion of a substantially elliptical surface of revolution.

7. The light recovery system of claim 1, wherein said reflector comprises at least a portion of a nearly spherical surface of revolution.

8. The light recovery system of claim 1, wherein said reflector comprises at least a portion of a substantially toric surface of revolution.

9. The light recovery system of claim 1, wherein said retro-reflector comprises a spherical retro-reflector disposed on a side of said source opposite said reflector.

10. The light recovery system of claim 1, wherein said first band is selected from the group consisting of:
    infrared,
    red,
    orange,
    yellow,
    green,
    blue,
    indigo,
    violet,
    pink,
    white,
    magenta, and
    ultra-violet.

11. The light recovery system of claim 1, wherein said second band is selected from the group consisting of:
    infrared,
    red,
    orange,
    yellow,
    green,
    blue,
    indigo,
    violet,
    pink,
    white,
    magenta, and
    ultra-violet.

12. The light recovery system of claim 1, wherein said third band is selected from the group consisting of:
  infrared,
  red,
  orange,
  yellow,
  green,
  blue,
  indigo,
  violet,
  pink,
  white,
  magenta, and
  ultra-violet.

13. The light recovery system of claim 1, wherein said reflector comprises a primary reflector having a first optical axis, and said first focal point is a focal point of said primary reflector, said reflector comprising further:
  a secondary reflector having a second optical axis placed substantially symmetrically to said primary reflector such that said first and second optical axes are substantially collinear, and wherein said second focal point is a focal point of said secondary reflector; and
  wherein said rays of radiation reflect from said primary reflector toward said secondary reflector and converge substantially at said second focal point.

14. The light recovery system of claim 13, wherein said primary and secondary reflectors each comprise at least a portion of a substantially elliptical surface of revolution.

15. The light recovery system of claim 13, wherein said primary and secondary reflectors each comprise at least a portion of a substantially parabolic surface of revolution.

16. The light recovery system of claim 13, wherein:
  said primary reflector comprises at least a portion of a substantially elliptical surface of revolution; and
  said secondary reflector comprises at least a portion of a substantially hyperbolic surface of revolution.

17. The light recovery system of claim 13, wherein:
  said primary reflector comprises at least a portion of a substantially hyperbolic surface of revolution; and
  said secondary reflector comprises at least a portion of a substantially elliptical surface of revolution.

18. The light recovery system of claim 1, wherein said reflector has a coating that reflects only a pre-specified portion of the electromagnetic radiation spectrum.

19. The light recovery system of claim 18, wherein said pre-specified portion is selected from the group consisting of:
  infrared radiation,
  visible radiation,
  a pre-specified band of wavelengths of radiation,
  a specific color of radiation, and
  a combination thereof.

20. The light recovery system of claim 18, wherein said coating transmits radiation selected from the group consisting of:
  infrared radiation, and
  ultraviolet radiation.

21. The light recovery system of claim 1, wherein said retro-reflector has a coating that reflects only a pre-specified portion of the electromagnetic radiation spectrum.

22. The light recovery system of claim 21, wherein said pre-specified portion is selected from the group consisting of:
  infrared radiation,
  visible radiation,
  a pre-specified band of wavelengths of radiation,
  a specific color of radiation, and
  a combination thereof.

23. The light recovery system of claim 1, wherein said source of electromagnetic radiation is selected from the group consisting of:
  a single-chip;
  a double-chip; and
  a triple-chip.

24. The light recovery system of claim 1, wherein said source of electromagnetic radiation comprises an arc lamp.

25. The light recovery system of claim 24, wherein said arc lamp comprises a lamp selected from the group consisting of a xenon lamp, a metal halide lamp, an HID lamp, or a mercury lamp.

26. The light recovery system of claim 1, wherein said source of electromagnetic radiation is selected from the group consisting of a halogen lamp, and a filament lamp.

27. The light recovery system of claim 26, comprising further:
  an infrared reflector disposed in a path of said radiation.

28. The light recovery system of claim 27, wherein said infrared reflector is disposed proximate to an interior of said reflector.

29. The light recovery system of claim 28, wherein said infrared reflector is disposed mediate between said reflector and said source.

30. The light recovery system of claim 1, comprising further:
  an image projection system disposed proximate to said output surface to collect substantially all of said radiation.

31. The light recovery system of claim 30, wherein said image projection system is selected from the group consisting of:
  an LCOS imager,
  a DMD chip, and
  a transmissive LCD panel.

32. The light recovery system of claim 30, comprising further:
  a PBS disposed mediate between said output surface and said image projection system, said PBS collecting and polarizing substantially all of said radiation into a first polarization and a second polarization;
  wherein said radiation of said first polarization is transmitted; and
  radiation of said second polarization is reflected.

33. The light recovery system of claim 32, wherein said PBS comprises a wire-grid polarizer.

34. The light recovery system of claim 32, comprising further:
  a wave plate disposed in a path of said radiation of said second polarization.

35. The light recovery system of claim 34, wherein said wave plate is disposed proximate to an interior of said reflector.

36. The light recovery system of claim 34, wherein said wave plate is a quarter-wave plate.

37. A method of using the light recovery system of claim 1, comprising:
  positioning a source of electromagnetic radiation at a first focal point of a reflector;

producing rays of radiation by said source;

reflecting a portion of said rays of radiation by said reflector toward a second focal point;

converging substantially said rays of radiation at said second focal point;

reflecting at least part of a portion of the rays of radiation that do not impinge directly on said reflector toward said reflector through the first focal point of said reflector;

positioning an output light pipe having an input surface and an output surface so said input surface is substantially proximate to said second focal point;

collecting substantially said rays of radiation at said input surface;

passing said rays of radiation through said output light pipe;

transmitting substantially a first band of said radiation and reflecting substantially a second and third bands of said radiation;

transmitting said second band of said radiation and reflecting substantially said first and third bands of said radiation; and transmitting said third band of said radiation and reflecting substantially said first and second bands of said radiation.

* * * * *